United States Patent
Vidal et al.

(10) Patent No.: US 8,200,048 B2
(45) Date of Patent: Jun. 12, 2012

(54) MEASURING APPARATUS, VENTURI AND VENTURI INSERTION TOOL

(75) Inventors: Jose Luiz Arias Vidal, Rio de Janiero (BR); Renata Mercante Born, Rio de Janiero (BR); João Luiz dos Santos Lorenzo, Rio de Janiero (BR); José Baza Quintanilla, Macaé (BR)

(73) Assignees: Petróleo Brasileiro S.A.—Petrobras, Rio De Janeiro (BR); Surco Tecnologia Industrial LTDA, Macaé, RJ (BR)

( * ) Notice: Subject to any disclaimer, the term of this patent is extended or adjusted under 35 U.S.C. 154(b) by 314 days.

(21) Appl. No.: 12/612,214

(22) Filed: Nov. 4, 2009

(65) Prior Publication Data

US 2010/0111467 A1    May 6, 2010

(30) Foreign Application Priority Data

Nov. 5, 2008   (BR) ...................................... 0804823

(51) Int. Cl.
    *G02B 6/00*      (2006.01)
(52) U.S. Cl. ........................................................ 385/12
(58) Field of Classification Search ...................... 385/12
    See application file for complete search history.

(56) References Cited

U.S. PATENT DOCUMENTS

| | | | |
|---|---|---|---|
| 6,082,455 A * | 7/2000 | Pringle et al. | 166/250.15 |
| 6,915,686 B2 * | 7/2005 | Baustad | 73/152.46 |
| 7,266,261 B2 | 9/2007 | Vidal et al. | |
| 7,308,165 B2 | 12/2007 | Vidal et al. | |

* cited by examiner

*Primary Examiner* — Uyen Chau N Le
*Assistant Examiner* — Chris Chu
(74) *Attorney, Agent, or Firm* — Nixon & Vanderhye PC

(57) ABSTRACT

This invention comprises a system for measurement of temperature and pressure in oil wells. It comprises a single hybrid mandrel housing a double pressure and temperature optical sensor, capable of measuring temperature and pressure both in the ring and in the production tubing of an oil well and an insertable venturi tube inserted in the direction of a pressure differential optical sensor, capable of taking flow rate measurements, the installation aspects of which are substantially simplified.

With the proposed construction, it is possible for one single hybrid mandrel (30) to read the pressure and temperature in the ring and tubing and the flow rate. With this, changes of flow rate are also possible, without the need to stop production for long periods for the hybrid mandrel (30) to be replaced, the mere replacement of the insertable venturi (12) sufficing, by means of an insertion and extraction GS tool (17), which is an operation requiring a much shorter time.

15 Claims, 12 Drawing Sheets

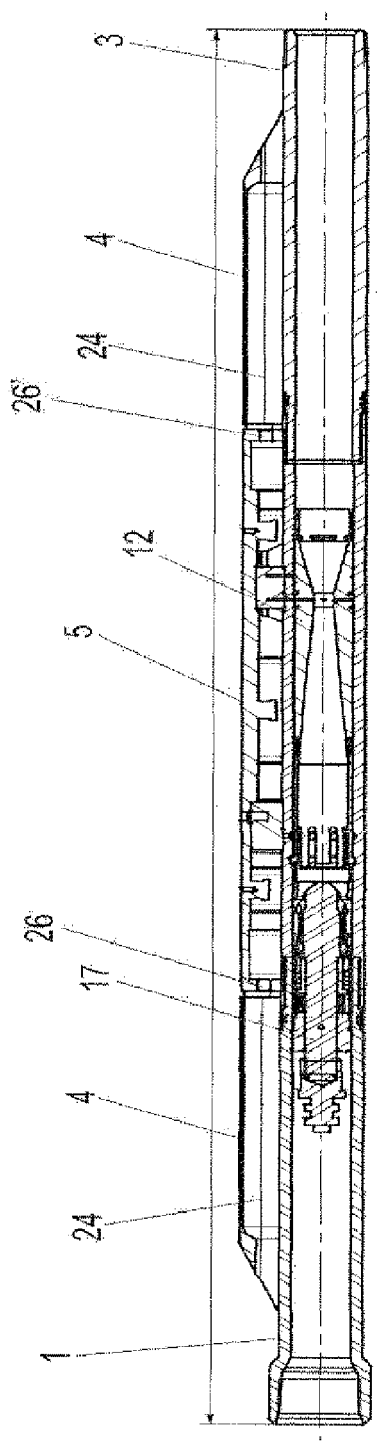
Fig. 3 – SECTION AA
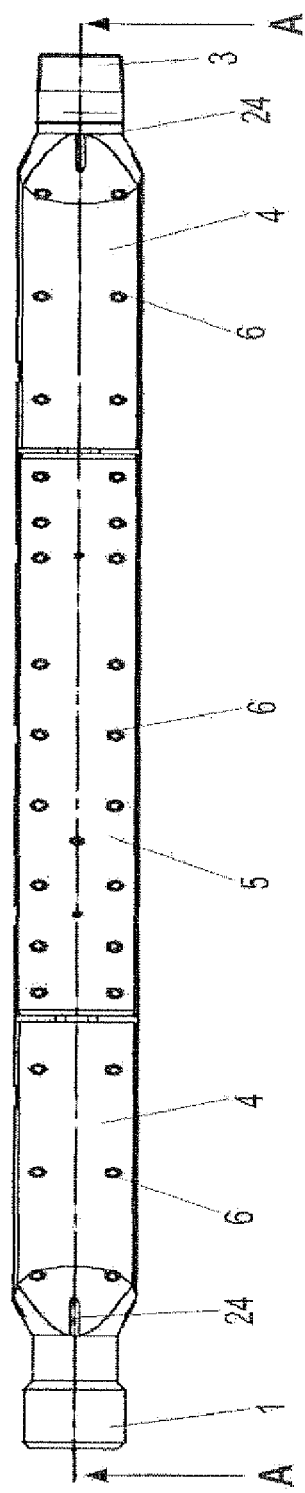
Fig. 2

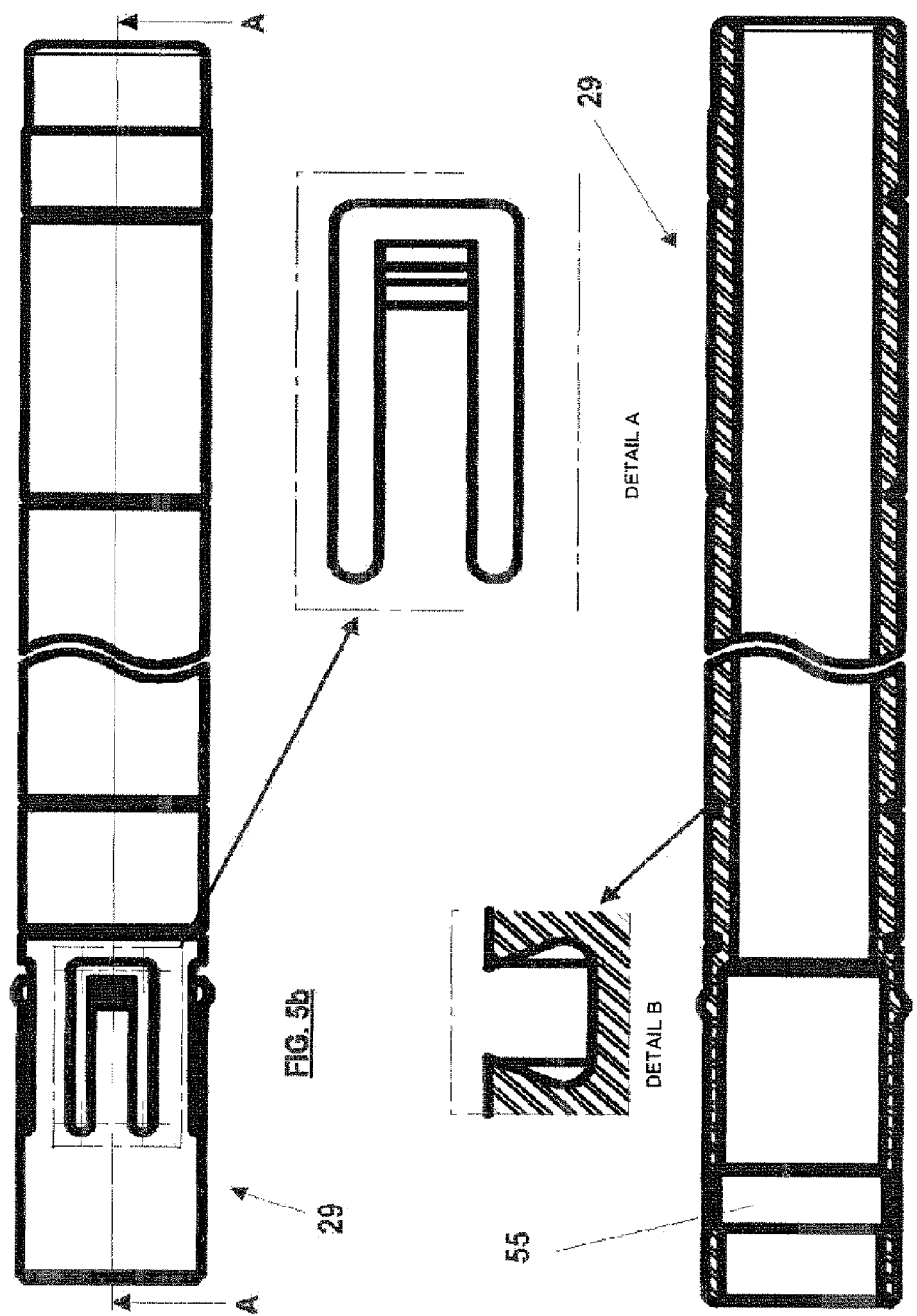

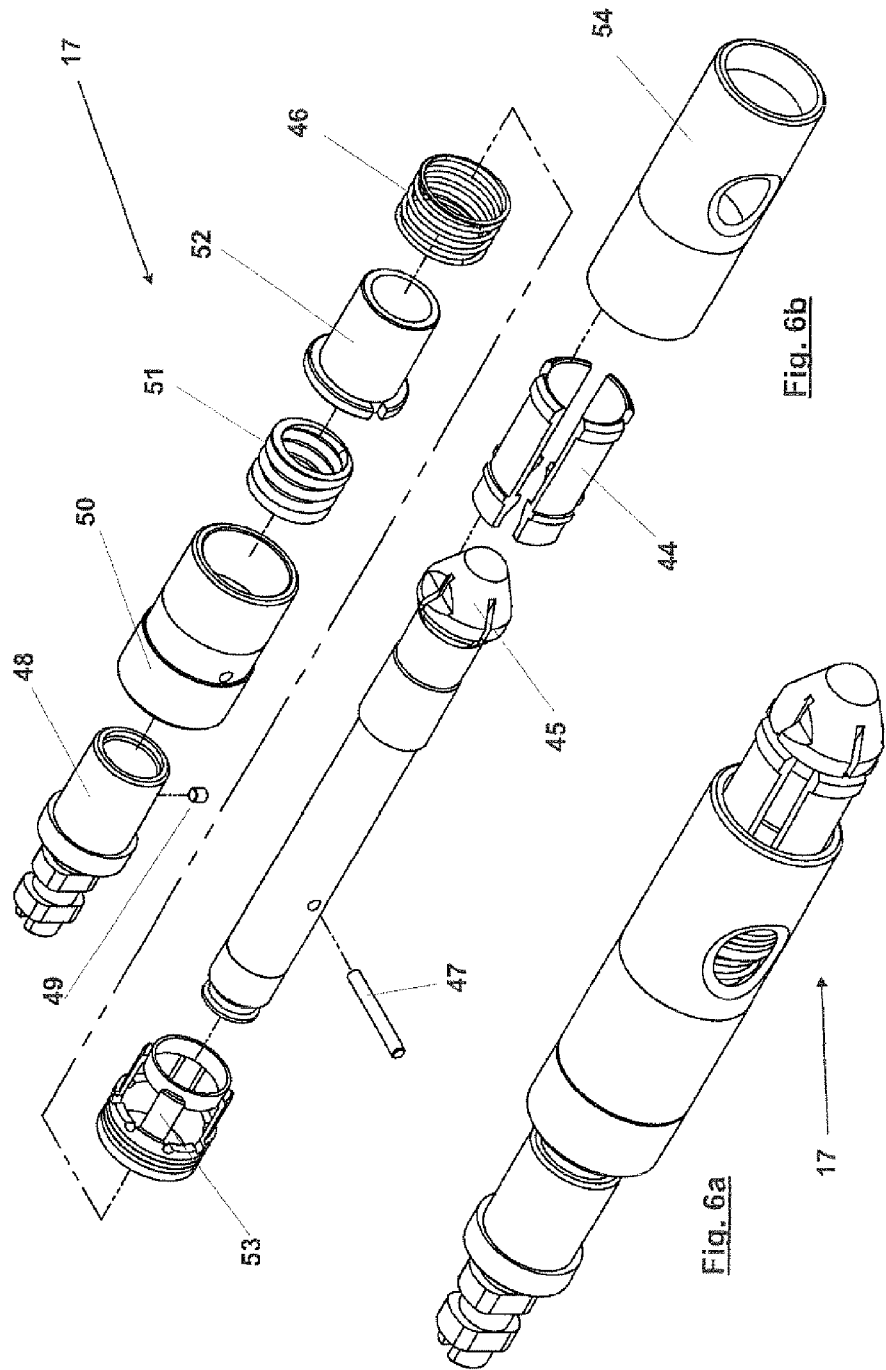

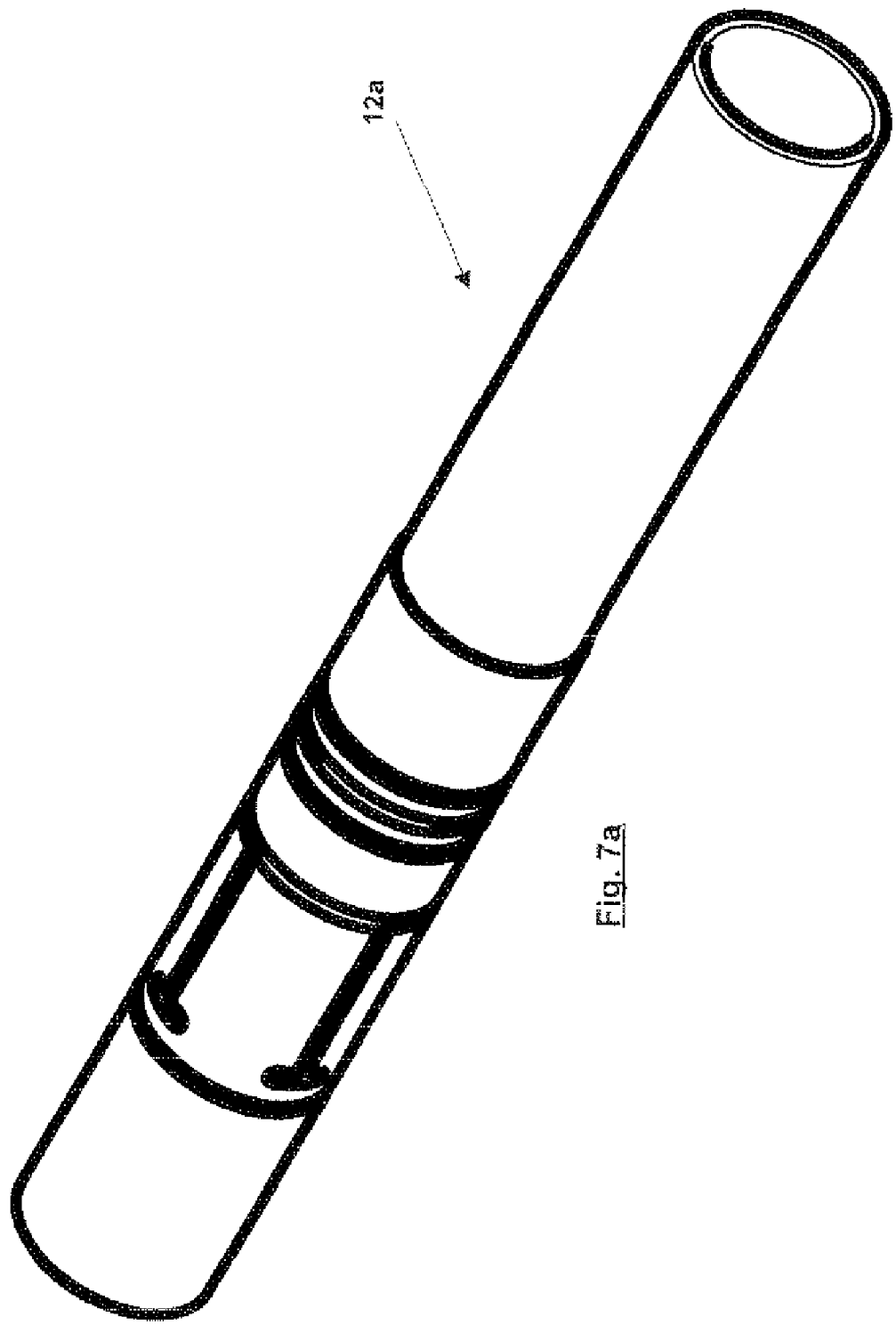

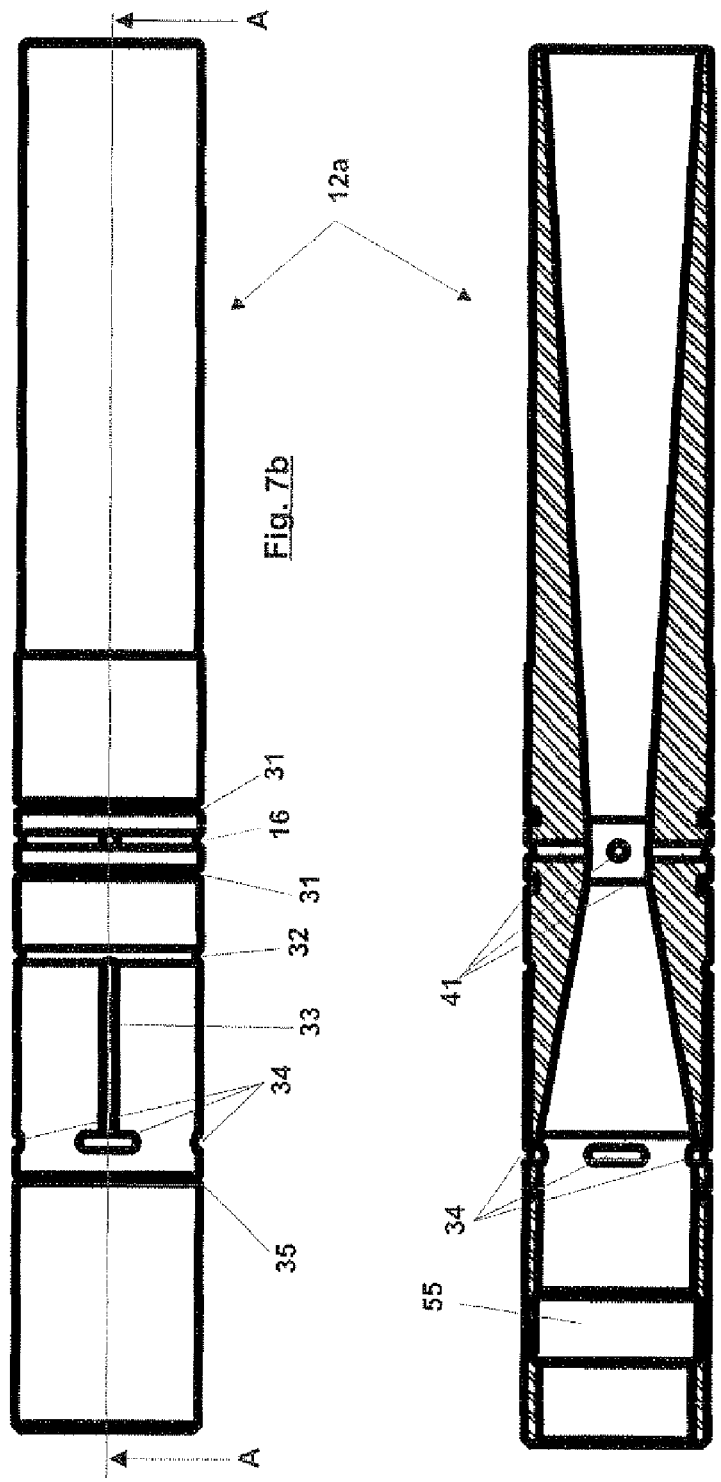

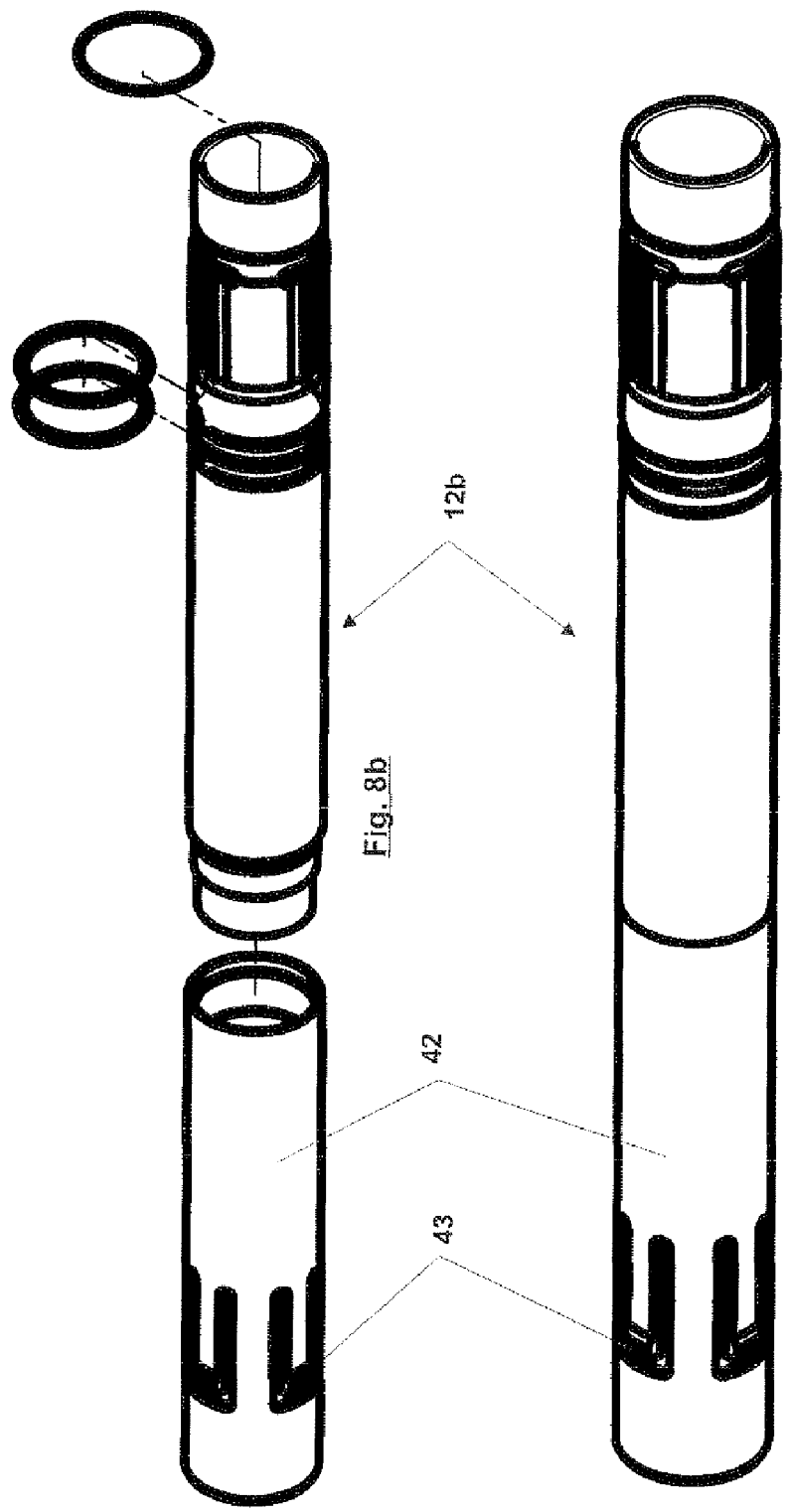

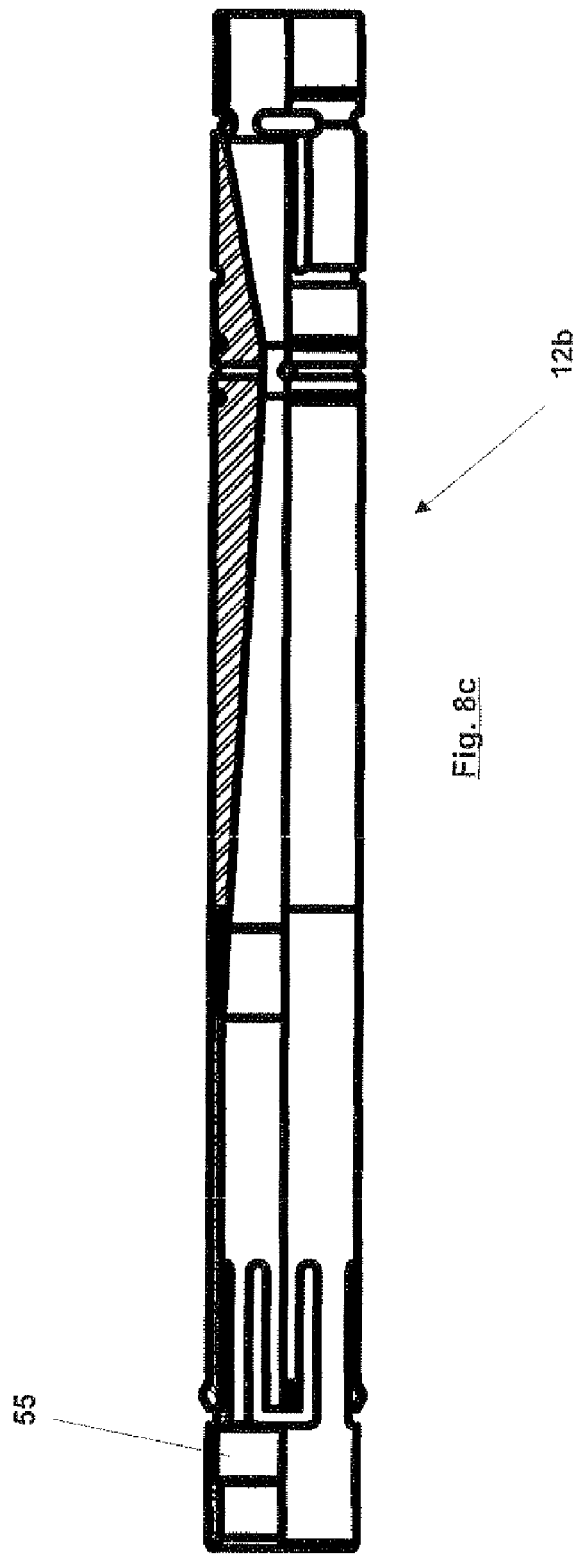

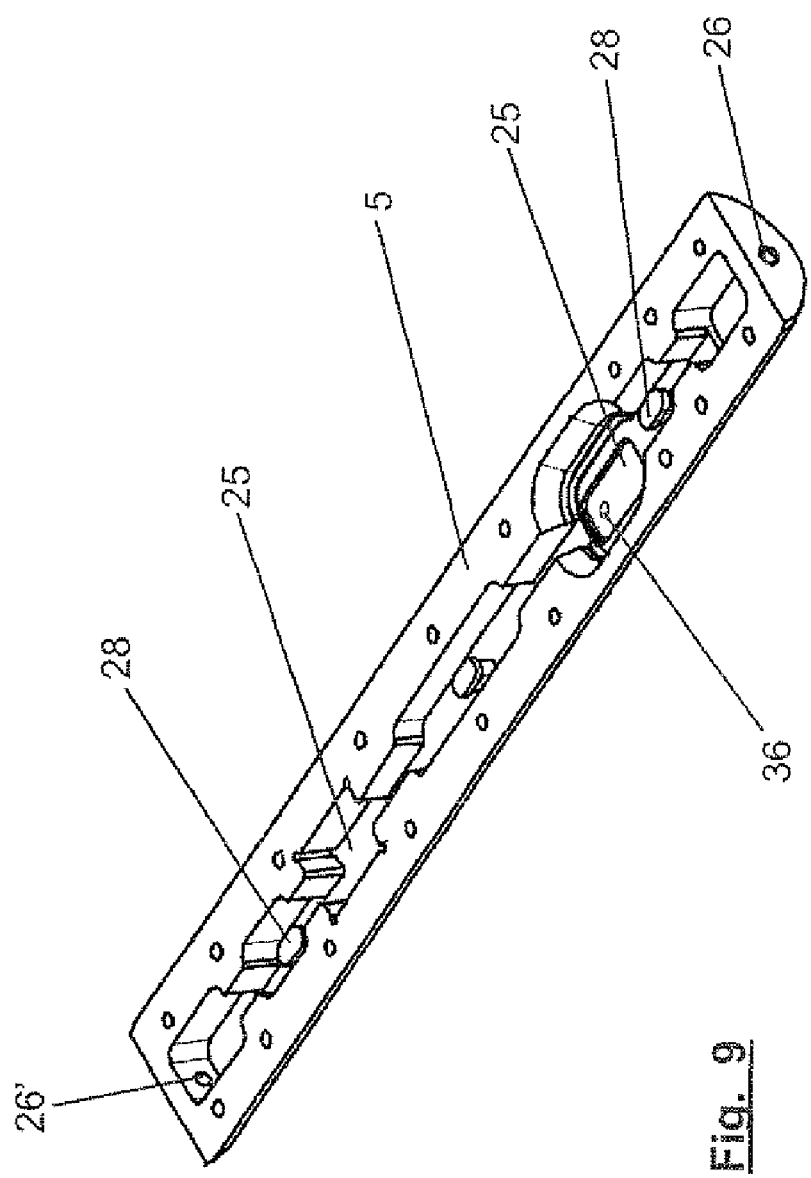

MEASURING APPARATUS, VENTURI AND VENTURI INSERTION TOOL

This application claims priority to Brazil Application No. PI 0804823-1 filed 5 Nov. 2008, the entire contents of which is hereby incorporated by reference.

FIELD OF THE INVENTION

This invention relates to a device which co-ordinates in one single assembly the measurement both of temperature and pressure and of flow rate in oil wells, these measurements being taken in real time by means of optical sensors. The device uses an insertable venturi, with which it is possible to measure the flow rate of the well, with the advantage of allowing its replacement whenever a venturi with features different from the one which is being used is necessary. The invention applies especially to measurements in oil wells.

BASES OF THE INVENTION

The use of optical fibers as sensors/transmitters for the measurement of the most varied physical and chemical quantities is a technology which is in genuine development. In view of their features of light weight, flexibility, long transmission distance, low reactivity of the material, electrical insulation, electromagnetic immunity, long working life, in addition to dispensing with electronic circuits and movable mechanical elements at the place of measurement, when combined with the use of Bragg gratings, make the optical fiber extremely advantageous for measurements in places difficult of access. This is a common situation in, for example, the operation of oil production wells.

RELATED TECHNOLOGY

With a view to taking advantage of these optical fibre features, transducers were developed for measurement of temperature and pressure, described in Brazilian patent document PI 0403240-3 and transducers were used for the measurement of flow rate, described in Brazilian patent document PI 0403786-3, with the use of optical fiber.

However, there was still a lack of devices suitable for the application of these transducers to the measurement of pressure, temperature and flow rate in oil wells. Initially, a prototype was developed which used two separate mandrels to apply the optical transducers described in the documents referred to above: one mandrel for measuring just pressure and temperature and another mandrel for measuring flow rate. This configuration gave three problems. One problem was in the measurement of pressure and temperature in the tubing, as the mandrel which measures pressure and temperature only measures these quantities in the ring of the oil well, as there was only one pressure point. Another problem was in the simultaneous measurement of the three quantities, as it was necessary to use some optical connectors in order for these two mandrels to be connected with each other. With the presence of optical connectors, the optical losses were much greater and the optical signal became weak in addition to being much more laborious and difficult to fit, and the last problem was that the flow rate mandrel could only be used for fluid injection wells, not for production wells.

It was sought to solve the problems found in the prior art through the creation of a new mandrel with a configuration with which it would be possible to house in its structure both the pressure and temperature sensor and the flow rate sensor, whereby the measurements could be taken simultaneously in onshore and offshore oil wells in a compact form. Furthermore, the new mandrel makes its fitting less laborious and more effective, as there is no need to use optical connectors. The new mandrel can also be used both for injection wells and for production wells.

Furthermore, the invention is capable of measuring pressure and temperature both in the ring and in the tubing of oil wells, as the sensor used is different from the one described in patent PI 0403240-3. The sensor used is known as 2P2T (double pressure and temperature). Bearing in mind that it is common for these mandrels to be fitted in tubing at depths exceeding 1,000 meters, a special tool known as the "GS" tool was also developed, this having the purpose of carrying out the insertion and extraction of insertable venturis which are fastened in a removable manner to the mandrel without the hybrid mandrel's being withdrawn from the bore-hole bottom. This "GS" tool works in conjunction with the known wire line operation.

SUMMARY OF THE INVENTION

This invention consists of equipment for measuring temperature, pressure and flow rate in oil wells. It comprises one single hybrid mandrel to which are fitted a double transducer for measuring pressure and temperature in the tubing and ring, and a pressure differential transducer for measuring the flow rate. In this configuration, there are four pressure points; two for measuring internal pressure in the tubing and external pressure in the ring and two for measuring the internal pressure difference in the tubing (flow rate). In addition, an insertable venturi tube is fitted, which is fastened in a removable manner to the mandrel. In this configuration, it is necessary to carry out one single cable-sensor optical correction in order for the two sensors to be connected in series, which makes the system compact, thus optimizing fitting, making it much faster and more effective.

The hybrid mandrel of this invention comprises, essentially, an upper body, central body, lower body, central and side covers, an insertable venturi, double pressure and temperature transducer and a differential pressure transducer. With this configuration, several mandrels can be intercalated in the production tubing, making it possible to take measurements at various different levels in the well.

BRIEF DESCRIPTION OF THE DRAWINGS

FIG. 2 shows a top view of the hybrid mandrel of the invention.

FIG. 3 shows a section, as indicated in FIG. 2.

FIG. 5b shows a side view of the pack off.

FIG. 5c shows a section, as indicated in FIG. 5b.

FIG. 6a shows a perspective view of the insertion and extraction tool (GS).

FIG. 6b shows an exploded view of the GS tool.

FIG. 7a shows a perspective view of the injection venturi.

FIG. 7b shows a side view of the injection venturi.

FIG. 7c shows a section, as indicated in FIG. 7b.

FIG. 8a shows a perspective view of the production venturi.

FIG. 8b shows an exploded view of the production venturi.

FIG. 8c shows a partially sectioned side view of the production venturi.

FIG. 9 shows a perspective of the central cover, with the lower part turned upwards.

DETAILED DESCRIPTION OF THE PREFERRED EMBODIMENT

Figure 1:
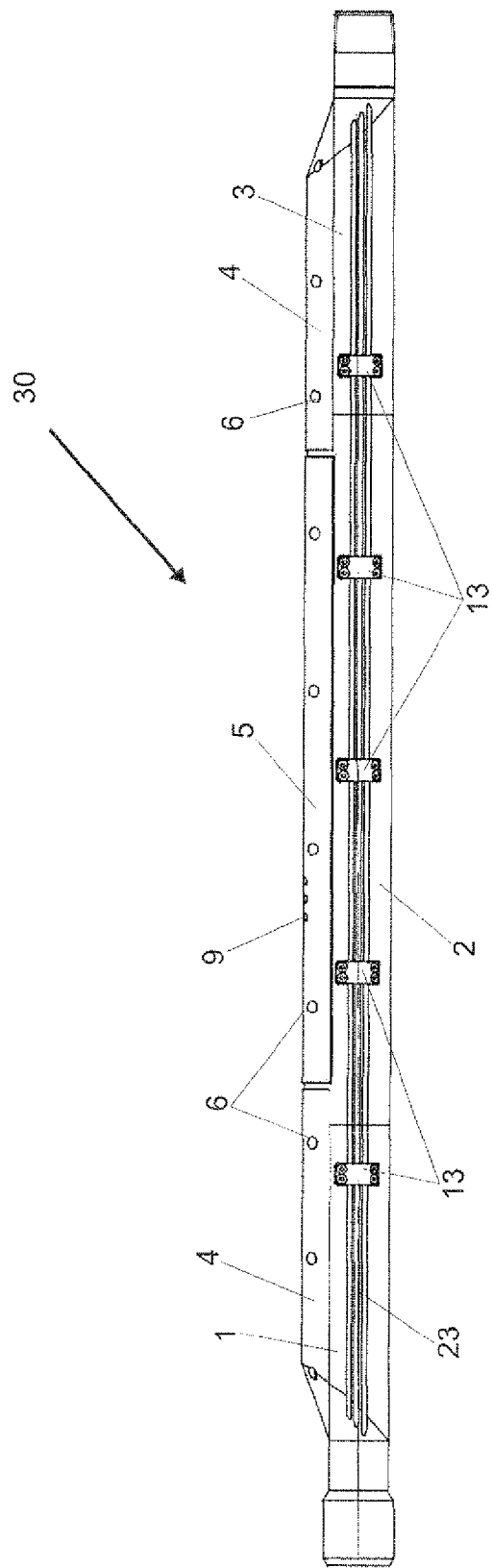
FIG. 1 shows a side view of the hybrid mandrel of the invention.

Seeking to assist understanding of the invention, a detailed description thereof will be given on the basis of the illustrations which accompany this specification and which are an integral part of it.

As can be noted in FIGS. 1 to 4, the equipment for measuring, which is the subject of this invention, is fitted in a hybrid mandrel (30) comprising essentially the following components: upper body (1), central body (2), lower body (3), central cover (5), side covers (4), insertable venturi (12), double pressure and temperature transducer (7) and differential pressure transducer (18). Given the high pressures which the hybrid mandrel (30) must withstand, in addition to relatively high temperatures, it must have a structure and fastening elements suitable for this situation, as will be detailed within this specification.

The upper body (1) and lower body (3) are each fastened to an end of the central body (2), forming a single part. To ensure sealing, sealing rings (8) of the O-ring type are used, as shown in greater detail in FIG. 4.

Figure 4:
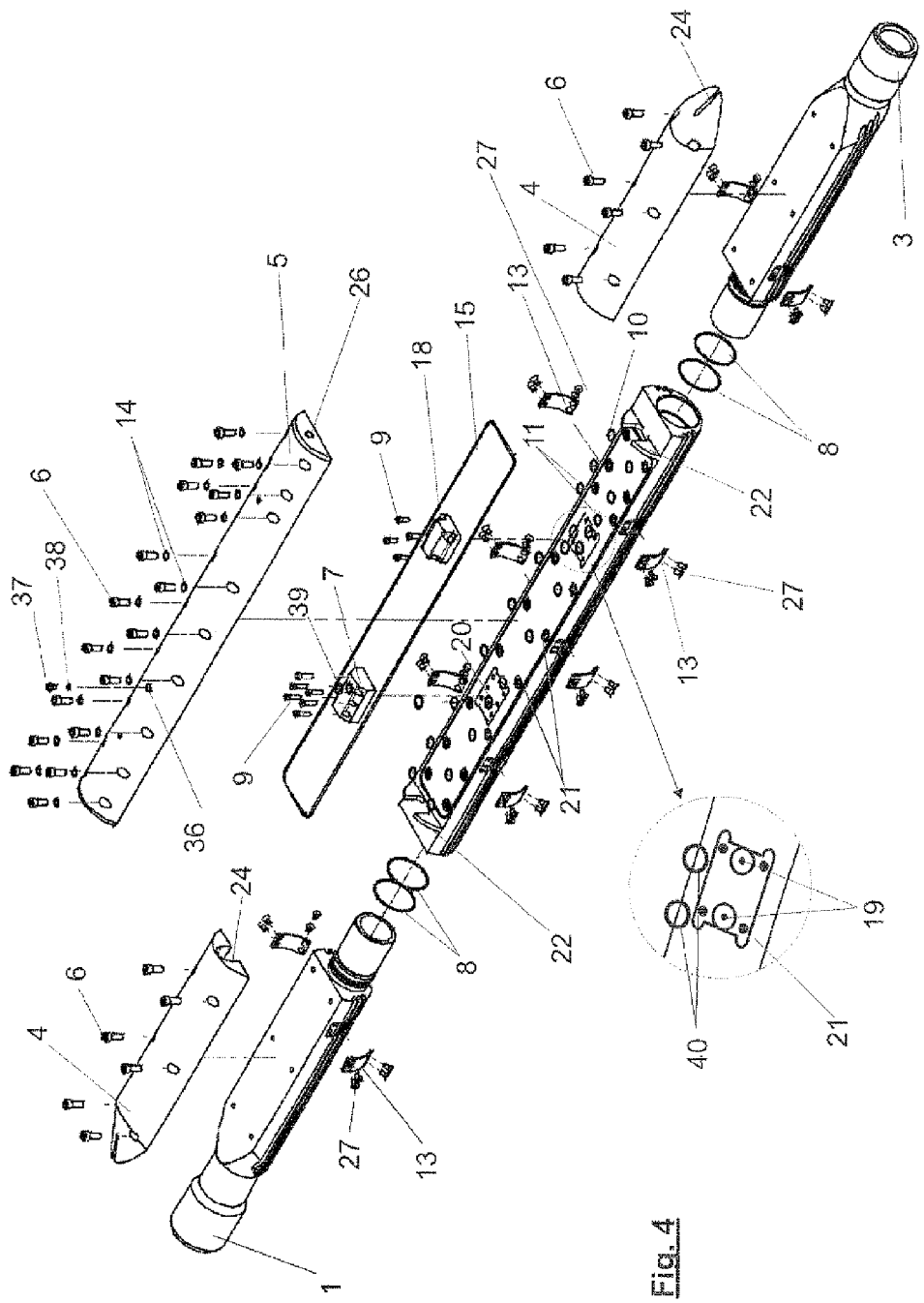
FIG. 4 shows an exploded view of the hybrid mandrel.

On its upper face, the central body (2) has two holes (19)—shown in detail in FIG. 4—which communicate with the inside of the insertable venturi (12)—shown in detail in FIG. 3 and with the differential pressure transducer (18), in order for it to read the pressure differential and a third hole (20), which communicates with the inside of the hybrid mandrel (30) and with the pressure and temperature double transducer (7), in order for it to read pressure and temperature in the well tubing. The central body (2) also has tapped holes (21) in its upper face for taking the screws (6) of the central cover (5) and screws (9) of the differential pressure transducer (18) and double pressure and temperature transducer (7).

As can be visualized better in FIG. 4, fastened to the central body (2) are also the guides (22) for the fitting in of rings (not shown) which guide the passing of the optical fibre (not shown) through the slits (24) of the side covers (4) to the hole (26) in the central cover (5). The double pressure and temperature transducer (7) and the differential pressure transducer (18) are fastened to the central body (2) by means of the fastening screws (9).

To ensure a complete seal between the central body (2) and central cover (5), a ring (15) of substantially rectangular format is used. With this same objective, O-ring type rings (10 and 11) are placed on all the screws (6) in the space between the central cover (5) and the central body (2). As an additional sealing reinforcement, the screws (6) which hold the central cover (5) can have seal washers (14). In the same way, it is desirable for sealing rings (40) to be placed at the holes (19 and 20) to ensure a perfect seal between the central body (2) and the two transducers (7 and 18).

The main purpose of the lower body (3) and upper body (1) is to make possible the connection of the hybrid mandrel (30) of this invention with the oil production tubing, having for this purpose a male thread on the end of the lower body (3) and a female thread on the end of the lower [sic] body (1). They each have a side cover (4), which is fastened by means of the fastening screws (6). The side covers (4) have slits (24) on their lower faces to allow the optical fiber cable to pass to the inside of the hybrid mandrel (30).

To the sides of the central body (2), upper body (1) and lower body (3) are applied slits (23), where the optical fiber cables (not shown) are fitted in to protect them from possible damage during handling of the device (see FIG. 1). After the placing of the cables in the slots (23), they are fitted with covers (13), which are fastened with screws (27) on the central body (2), upper body (1) and lower body (3) respectively, to keep the cables suitably held in place.

As illustrated in detail in FIG. 9, the central cover (5) has a recess (25) along its lower face, which begins close to one end and ends close to the other end. At each end of the central cover, the recess communicates with the outside by means of a hole (26 and 26'). The holes (26 and 26') coincide with the slits (24) of the two side covers (4), for passing the optical fibre through (see FIG. 3). At the places coinciding with the differential pressure transducer (18) and double pressure and temperature transducer (7), the recess (25) widens, so that they can be fitted in. Inside the recess (25), there are also two protuberances (28) for winding the optical fiber. The central cover (5) also has a hole (36) (see FIG. 4) coinciding with the double pressure and temperature transducer (7) so that it can read pressure and temperature in the ring where the hybrid mandrel (30) is inserted. A sealing ring (39) is inserted between the central cover (5) and the double transducer (7) so as to isolate interference with the reading taken by the double pressure and temperature transducer (7) on the outside of the hybrid mandrel (30). If necessary, the hole (36) can be closed up with a plug (37) and an O-ring type of ring (38).

Figure 5A:
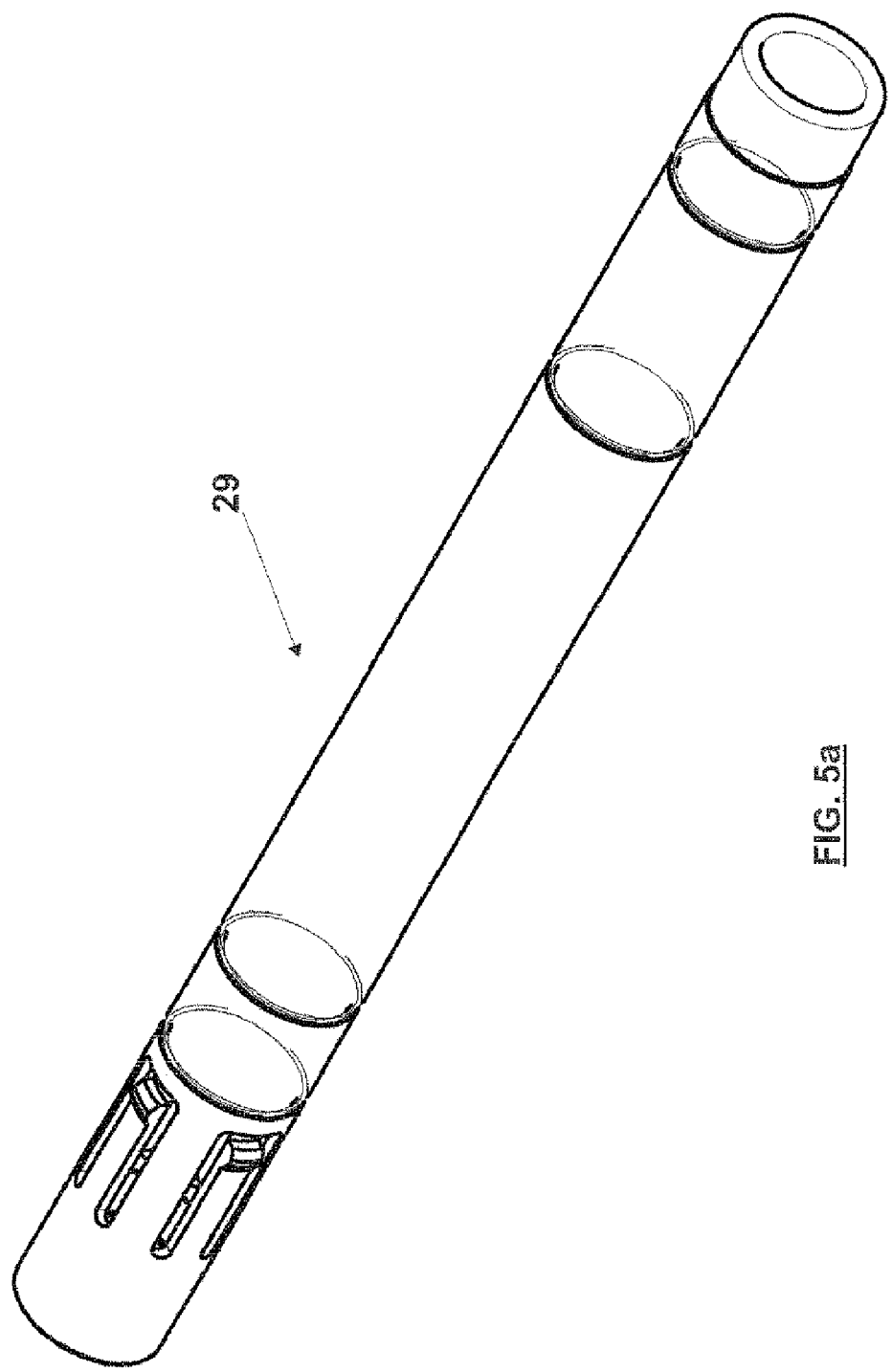
FIG. 5a shows a perspective view of the pack off type of venturi.
Figure 6C:
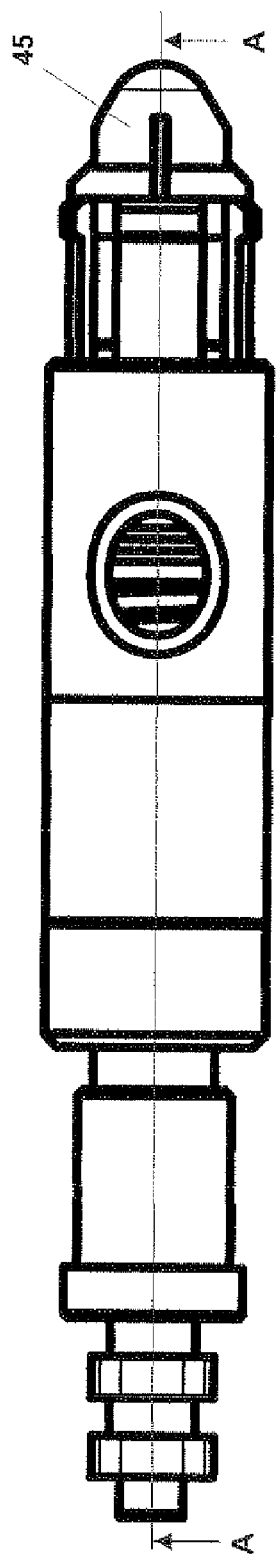
FIG. 6c shows a side view of the GS tool fitted.
Figure 6D:
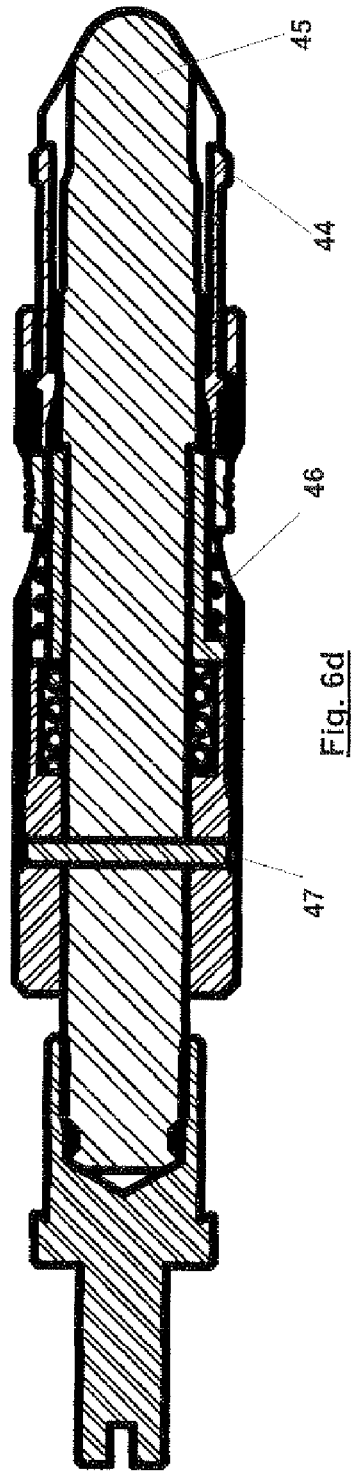
FIG. 6d shows a section, as indicated in FIG. 6c.

The insertable venturi (12) appears in two types: one for injection (12a), shown in FIGS. 7a to 7c and the other for production (12b), shown in FIGS. 8a to 8c. The first one is for being used in operations of injecting fluids into wells and the second one is for being used in oil extraction operations. Each of the two types has the same basic construction. Externally, they have a cylindrical section and internally they have a reduction of the straight section, to produce the venturi effect. In addition to these two types, another type of venturi was developed. This is known as pack off (29) and is shown in FIGS. 5a to 5c. This pack off is a type of blind venturi, the purpose of which is to protect the optical sensors so that they are not damaged when the oil well production tubing is pressurised in order for the packer to seat.

The injection insertable venturi (12a) has several slits along its outside diameter. A first slit (16) communicates with four holes which start from the venturi section of the smallest diameter and—after the fitting of the insertable venturi (12a) to the hybrid mandrel (30), it is aligned with one of the two holes (19). Close to this first slit are two other slits (31), one each side, which are fitted with O-rings to produce a perfect seal against the internal wall of the hybrid mandrel (30), so as to isolate interference with the reading taken by the differential pressure transducer (18). Further to the left, there is a fourth slit (32) which, after the fitting of the insertable venturi (12a) in the hybrid mandrel (30), is aligned with the second of the two holes (19). From this slit, four longitudinal slits (33) lead off and run to four transverse slits (34), which communicate with the inside of the insertable venturi (12a) in its section of greatest diameter. After the fitting of the insertable venturi (12a) in the hybrid mandrel (30), one of these transverse slits (34) is aligned with the hole (20), making it possible for the double pressure and temperature transducer (7) to measure temperature and pressure in the inside of the well tubing. In the case of the double transducer (7), the alignment of one of the transverse slits (34) with the hole (20) near the insertable venturi (12) only exists so that the pressure point is not obstructed, i.e. so that there is communication of the double transducer (7) with the well tubing. Furthermore, the pressure prevailing at this spot is transmitted through the transverse slit (34) of the longitudinal slit (33) and from the fourth slit (32) to the second of the two holes (19), making it possible for the differential pressure transducer (18) to measure the differential pressure between the largest and smallest section of the venturi. To the left of the transverse slits (34), there is a fifth slit (35) which is also fitted with an O-ring. This O-ring and the O-ring to the left of the first slit (16) produce a second sealed area for preventing interference with the readings of the two transducers (7 and 18).

The production insertable venturi (12b) has the same configuration as the injection insertable venturi (12a) but with its profile rotated through 180° and having larger dimensions. As it needs to withstand the high upward pressure exerted by the oil being extracted, the insertable venturi (12b) is fitted with a holder (42) with locks (43), the objective of which is to hold it in the hybrid mandrel (30), preventing the oil being extracted from pushing it. The holder (42) is fitted on to the insertable venturi (12b) as shown in FIGS. 8a and 8b. The larger size of the production insertable venturi (12b) is due to the addition of this holder (42).

It is to be emphasized that the injection insertable venturi (12a) receives downward pressure from the fluid being injected into the well and, for this reason, does not need to have locks, as a subtle difference in diameter at the end of the injection venturi body seats the venturi in the mandrel, preventing the injection insertable venturi (12a) from being pushed by the fluid.

The transducer (7) of the double pressure and double temperature type, called 2P2T, makes it possible to measure pressure and temperature both in the ring and in the production tubing in an oil well. The reading by this transducer (7) is carried out with the use of optical reading equipment, also known as a data acquisition system, described in Brazilian patent document PI 0403268-3, The reading of the pressure and temperature in the ring and in the tubing is carried out by the optical data acquisition system, described in Brazilian patent PI 0403268-3, which reads the change in wavelength of the Bragg grating of the optical sensors and—through a calibration equation—this change in wavelength is converted to pressure and temperature.

A similar procedure takes place with flow rate: the optical reading system reads the change in wavelength at two points, and this difference in wavelength is converted, through a calibration equation, to difference in pressure. With Bernoulli's equation, already known in physics, the difference in pressure is converted to flow rate.

The transducer (18) for measuring differential pressure is similar to the one described in Brazilian patent document PI 0403786-3.

The hybrid mandrel (30) of this invention works with insertable venturis (12) which have different beta values (beta means the ratio between the largest and smallest diameter of the venturi), so as to adapt it to the flow rate of the well where it is installed. The insertable venturis (12) which are used in hybrid mandrels can have various different betas which correspond to various different flow rates. From among the various types of insertable venturis (12), the most common are those of beta 0.21, 0.4, 0.5 and 0.6 (production and injection of each one).

The principle of operation of flow rate measurement is as follows: the passing of the flow through the venturi generates, by means of the differences in velocities at the internal pressure points, a pressure differential between the largest and smallest diameter of the venturi (betas). This pressure difference is measured in the optical pressure differential transducer which converts the pressure difference to a change in wavelength. The surface reading system measures this change and—in accordance with the calibration constants of this sensor—converts the change in optical wavelength to a pressure differential measurement. On the basis of the pressure differential measurement, a calculation is made of the flow rate as such by means of the venturi equations. The flow rate measurement can be via the ascending flow or descending flow, i,e. depending on the direction of flow, the sensor can measure in both directions. The insertable venturis (12) of the hybrid mandrel (30) are made for several types of betas (mathematical ratio between the smallest and largest diameter of the venturi). A special tool was developed for inserting and extracting insertable venturis (12), the said tool being called a GS tool (17), which is shown in FIGS. 6a to 6d and is used in conjunction with the known wire line operation. This GS tool (17) descends, is seated, places and removes any type of insertable venturi (12), including the blind pack off venturi (29), in the lowered position. It has claws (44) on its tip and these are designed to be seated and to lock in the internal fishing neck (55)—shown in detail in FIG. 7c—of the insertable venturi (12). The GS tool (17) is used simply by introducing the claws (44) and core (45) into the internal fishing neck (55) of the insertable venturi (12). The claws (44) withdraw, compressing the spring (46) of the claw on meeting the chamfered upper part of the insertable venturi (12) and become concealed in the core (45). The claws (44), on reaching the restriction and due to the expansion of the spring (46), fasten together in the restriction of the internal fishing neck (55) of the insertable venturi (12), ready for application (placing of the insertable venturi). When the insertable venturi (12) is duly positioned in its fastening place, downward blows are given, breaking the shear pin (47) and the core (45) moves downwards, concealing the claws (44) with the expansion of the spring (46) which keeps the core in the lower position.

In order for the insertable venturi (12) to be removed, a new shear pin (47) must be fitted and the GS tool (17) must be lowered. When the GS tool (17) encounters the restriction of the insertable venturi (12), successive knocks or blows downwards are given until the insertable venturi (12) fastens to the GS tool (17). When the GS tool (17) fits into the insertable venturi (12), the latter is pulled upwards and withdrawn. Due to these features, the GS tool (17) can be used in external fishing operations.

The GS tool (17) also comprises the fishing neck (48), fastening screw (49), upper sub (50), cylinder spring (51), spring retainer (52), claw retainer (53) and cylinder (54).

The fishing neck (48) is designed so that, if the GS tool (17) comes off the wire line, it is possible to recover it by means of external fishing. The fastening screw (49) serves to prevent the unscrewing of the fishing neck (48) from the core (45), i.e. so that the fishing neck (48) does not become unfastened from the core (45). The upper sub (50) is the upper part which moves from the GS tool (17). The cylinder spring (51) is used to move all the movable part of the GS tool (17). The spring retainer (52) is a part of the GS tool (17) which keeps the spring compressed beside the shear pin (47). The claw retainer (53) is used to keep the claws (44) correctly positioned and equidistant. The cylinder (54) is the external part of the GS tool (17) which moves all the movable parts of the GS tool (17).

Example of Application

The equipment for measurement of double temperature and pressure and flow rate in oil wells was subjected to the qualification tests carried out in a thermal-hyperbaric chamber, which reproduces the conditions of an oil well under thermal and internal and external hydrostatic pressure loads. The term internal pressure is used with reference to a pressure applied inside the hybrid mandrel (tubing), whereas the term external pressure refers to a pressure applied inside the thermo-hyperbaric chamber but external to the hybrid mandrel (ring). In the hydrostatic test, the internal pressure was applied in the value of 7,500 psi for 10 minutes at room temperature, recording the temperature and pressure measurements of the reference transducers of the chamber. Afterwards, the pressure was set to zero and the temperature raised (up) to 90° C. Then, 7,500 psi was applied for 10 minutes and the pressure was rapidly set to zero. As the hybrid mandrel did not have any leaks or loss of pressure, it was considered approved. The external pressure was applied in the value of 7,500 psi for 10 minutes at room temperature, recording the temperature and pressure measurements of the reference transducers of the chamber. Afterwards, the pressure was set to zero and the temperature raised (up) to 90° C. Then, 7,500 psi was applied for 10 minutes and the pressure was rapidly set to zero. As the hybrid mandrel did not have any leaks or loss of pressure, it was considered approved.

Although the equipment for optical measurement and pressure and of flow rate has just been described with reference to the examples and attached drawings as the preferred embodiment of the invention, it shall be understood that various modifications can be introduced without leaving the scope of its protection, it being possible for some elements to be replaced with others with the same technical function, especially the materials used, their dimensions, shapes and proportions. Furthermore, although the claimed invention is characterized as equipment for optical measurement for double temperature and pressure and of flow rate, the invention may be embodied in the respective handling tool, for use with the equipment for measurement of double temperature and pressure and flow rate, wherein it lowers, seats and places the insertable venturi (12) in and withdraws it from a hybrid mandrel (30). In an example embodiment, the handling tool comprises a fishing neck (48), fastening screw (49), upper sub (50), cylinder spring (51), spring retainer (52), claw spring (46), claw retainer (53), shear pin (47), core (45), claws (44) and cylinder (54), in which: the claws (44) are designed to be seated and to lock in the internal fishing neck (55) of the insertable venturi (12), which withdraw, compressing the claw spring (46) on meeting the chamfered upper part of the insertable venturi (12), becoming concealed in the core (45) and, on reaching the restriction and due to the expansion of the spring (46), fasten together in the restriction of the internal fishing neck (55) of the insertable venturi (12), the shear pin (47) is breakable and, when this happens, the core (45) moves downwards, concealing the claws (44) with the expansion of the spring (46) which keeps the core in the lower position, the fishing neck (48) is designed so that, if the GS tool (17) comes off the wire line, it is possible to recover it by means of external fishing, the fastening screw (49) prevents the fishing neck (48) from unscrewing from the core, the upper sub (50) is the upper part which moves from the GS tool (17), the cylinder spring (51) is used to move all the movable part of the GS tool (17), the spring retainer (52) keeps the spring compressed beside the shear pin (47), the claw retainer (53) keeps the claws correctly positioned and equidistant and the cylinder (54), the external part, has the function of moving all the movable parts of the GS tool (17).

The invention claimed is:

1. An equipment for optical measurement of double temperature and pressure and of flow rate, comprising one single hybrid mandrel, housing a double pressure and temperature optical sensor and a differential pressure sensor, which comprises the following components: upper body, central body, lower body, central cover, two side covers, insertable venturi, double pressure and temperature transducer and differential pressure transducer, in which:

the upper body and lower body are each fastened to an end of the central body, forming a single part, the insertable venturi is fastened, in a removable manner, to the inside of the central body, the upper surface of the upper body, central body and lower body is flat and the following are fastened to it: one of the side covers, the central cover and the second side cover, and the pressure and temperature double transducer and the differential pressure transducer are fastened to the upper face of the central body, inserted in a recess in the central cover.

2. An equipment for optical measurement of double temperature and pressure and of flow rate, according to claim 1, wherein the central body has, in its upper face, two holes which communicate with the inside of the insertable venturi and with the differential pressure transducer, so that it can read the pressure differential and a third hole which communicates with the inside of the hybrid mandrel and with the pressure and temperature double transducer so that it can read the pressure and temperature in the well tubing.

3. An equipment for optical measurement of double temperature and pressure and of flow rate, according to claim 1, wherein the central body also has tapped holes in its upper face for taking the screws of the central cover and screws of the differential pressure transducer and pressure and temperature double transducer.

4. An equipment for optical measurement of double temperature and pressure and of flow rate, according to claim 1, wherein the central cover has a hole coinciding with the pressure and temperature double transducer so that it can read pressure and temperature in the ring where the hybrid mandrel is inserted.

5. An equipment for optical measurement of double temperature and pressure and of flow rate, according to claim 1, wherein the principal purpose of the lower body and upper body is to make possible the connection of the hybrid mandrel with the oil production tubing, having for this purpose a male thread on the end of the lower body and a female thread in the end of the lower body.

6. An equipment for optical measurement of double temperature and pressure and of flow rate, according to claim 1, wherein the side covers have slits in their lower faces to allow the optical fibres to pass through the inside of the hybrid mandrel.

7. An equipment for optical measurement of double temperature and pressure and of flow rate, according to claim 1, wherein the central cover has a recess along its lower face, which begins close to one end and ends close to the other end; at each end of the central cover, the recess communicates with the outside by means of holes, each one coinciding with the slit of the two side covers, for the optical fiber to pass through; at the places coinciding with the differential pressure transducer and the pressure and temperature double transducer, the recess widens to allow these to be fitted in, having, inside the recess, two protuberances for winding the optical fiber.

8. An equipment for optical measurement of double temperature and pressure and of flow rate, according to claim 1, wherein the insertable venturi is inserted in and withdrawn from the hybrid mandrel by means of a special tool called the GS tool.

9. An equipment for optical measurement of double temperature and pressure and of flow rate, according to claim 1, wherein two types of insertable venturi are used, one for injection and the other for production, the first one to be used in operations of injecting fluids into wells and the second one to be used in oil extraction operations.

10. An equipment for optical measurement of double temperature and pressure and of flow rate, according to claim 9, wherein both of these types have the same basic construction, externally a cylindrical profile while, internally, they have a reduction of the straight section to produce the venturi effect.

11. An equipment for optical measurement of double temperature and pressure and of flow rate, according to claim 10, wherein the production insertable venturi has a configuration the same as the injection insertable venturi but with its profile rotated through 180° and with greater dimensions due to housing a holder with locks to hold it in the hybrid mandrel, preventing the oil which is being extracted from pushing it.

12. An equipment for optical measurement of double temperature and pressure and of flow rate, according to claim 9, wherein the injection insertable venturi has several slits along its outside diameter, the following applying: a first slit communicates with four holes which start from the smallest diameter section of the venturi and, after the fitting of the insertable venturi in the hybrid mandrel, it is aligned with one of the two holes, two other slits, close to this first slit, one on each side, are fitted with O-rings to produce a perfect seal against the internal wall of the hybrid mandrel, so as to isolate interference with reading carried out by the differential pressure transducer, a fourth slit, further to the left which, after the fitting of the insertable venturi into the hybrid mandrel, is aligned with the second of the two holes, from this fourth slit, four longitudinal slits lead off and run to four transverse slits, which communicate with the inside of the injection insertable venturi in its section of largest diameter and, after the fitting of the injection insertable venturi in the hybrid mandrel, one of these transverse slits is aligned with the hole, making it possible for the pressure and temperature double transducer to measure temperature and pressure in the oil well tubing, the pressure prevailing at this point upstream from the venturi is transmitted, through the transverse slit, from the longitudinal slit and from the fourth slit to the second of the two holes, making it possible for the differential pressure transducer to measure the differential pressure between the largest and smallest sections of the venturi, to the left of the transverse slits, there is a fifth slit which is also fitted with an O-ring, which, together with the O-ring to the left of the first slit produce a second sealed area to prevent interference with the readings of the two transducers.

13. An equipment for optical measurement of double temperature and pressure and of flow rate, according to claim 1, wherein a third type of venturi is used, known as pack off, which is a type of blind venturi and the purpose of which is to protect the optical sensors so that they are not damaged when the oil well production tubing is pressurised for the packer to be seated.

14. An equipment for optical measurement of double temperature and pressure and of flow rate, according to claim 1, wherein the structure of the hybrid mandrel, the elements for connecting their various different parts and the elements for sealing between their various different parts are suitable for withstanding high pressures and temperatures.

15. An equipment for optical measurement of double temperature and pressure and of flow rate, according to claim 1, wherein, in the sides of the central body, upper body and lower body, there are external slits where the optical fiber cables are fitted in and, after the placing of the cables in the slits, they are fitted with covers which are fastened to the central body, upper body and lower body respectively, so as to keep the cables suitably held in place.

* * * * *